Nov. 9, 1926.
H. R. STRATFORD
1,606,270
APPARATUS FOR AND METHOD OF MAKING RUBBER TUBES
Original Filed Feb. 28, 1920   3 Sheets-Sheet 1
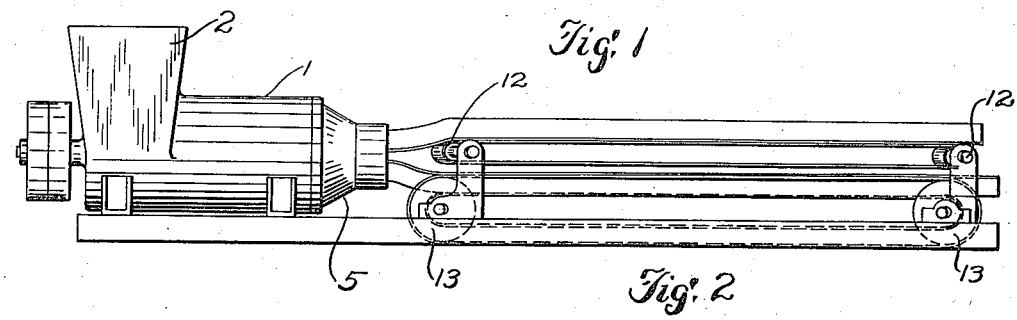
Fig. 1
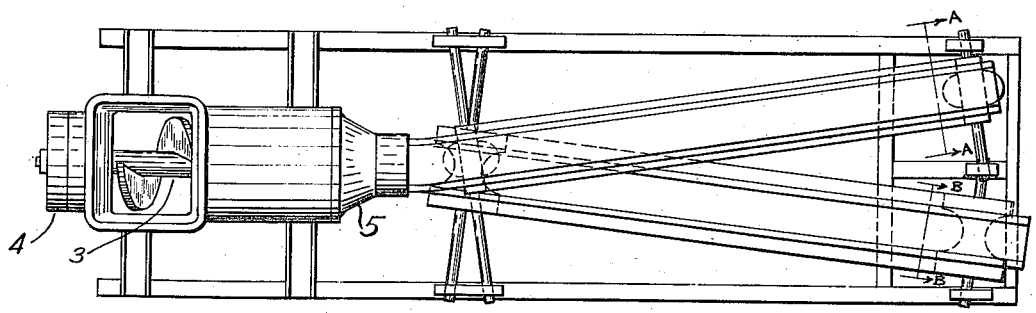
Fig. 2
Fig. 3
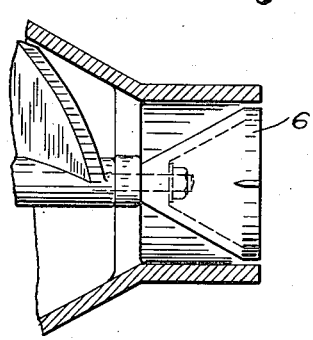
Fig. 4
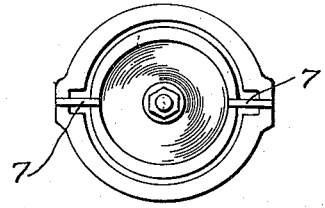
Fig. 14
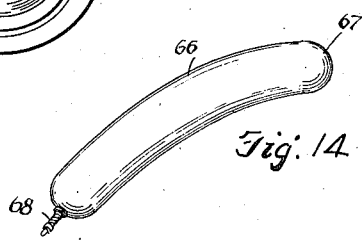
Fig. 5
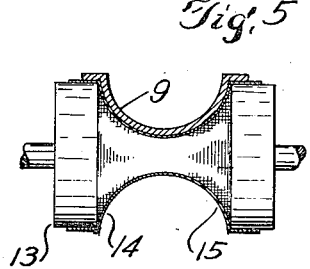
Fig. 6
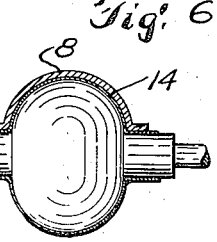
Inventor
Herbert R. Stratford
By Day, Oberlin & Day.
Attorneys Nov. 9, 1926.  
H. R. STRATFORD  
1,606,270  
APPARATUS FOR AND METHOD OF MAKING RUBBER TUBES  
Original Filed Feb. 28, 1920   3 Sheets-Sheet 2
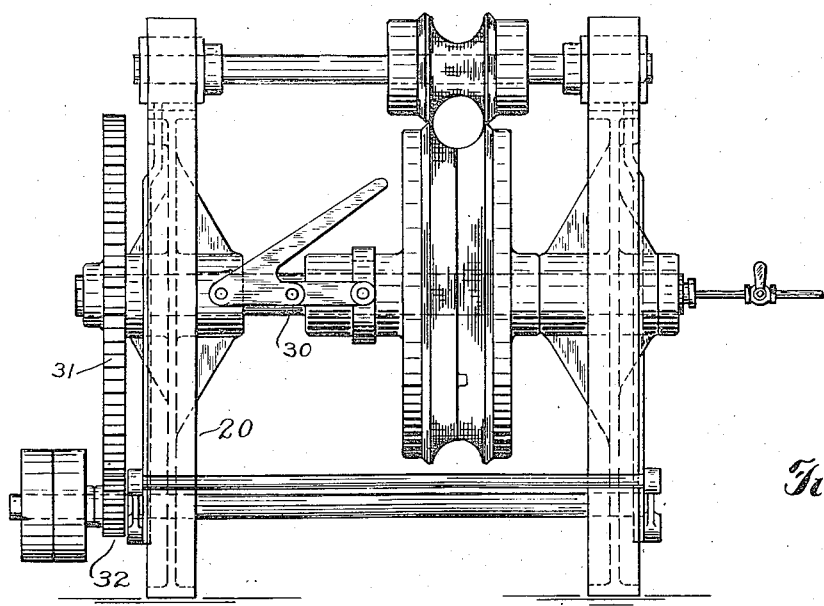
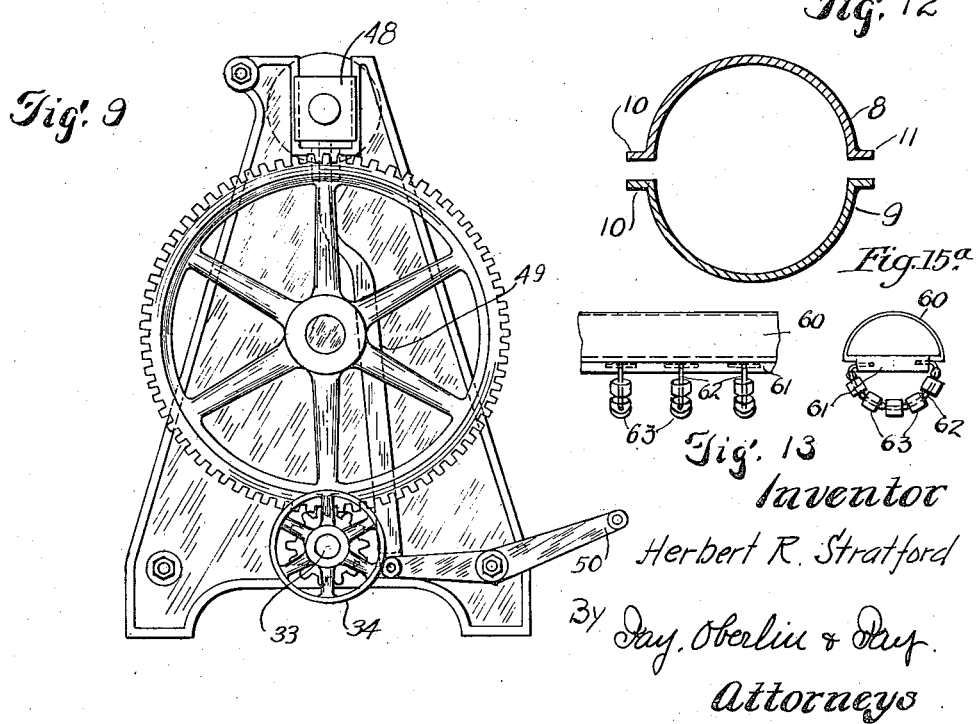
Inventor  
Herbert R. Stratford  
By Jay, Oberlin & Jay.  
Attorneys Nov. 9, 1926.

H. R. STRATFORD 1,606,270

APPARATUS FOR AND METHOD OF MAKING RUBBER TUBES

Original Filed Feb. 28, 1920    3 Sheets—Sheet 3

Inventor
Herbert R. Stratford
By Day, Oberlin & Day
Attorneys

Patented Nov. 9, 1926.

1,606,270

UNITED STATES PATENT OFFICE.

HERBERT R. STRATFORD, OF CLEVELAND, OHIO.

APPARATUS FOR AND METHOD OF MAKING RUBBER TUBES.

Application filed February 28, 1920, Serial No. 362,049. Renewed December 24, 1923.

The present invention, relating, as indicated, to an improved method of making rubber tubes, relates to not only an improved method, but also to an improved apparatus for making the endless tubes which are used in pneumatic tires. In making such tubes it is customary to cure a tube of raw rubber upon a straight pole and then circle the tube and join the ends, which results in a tube which has the same length along its inner and outer circumferences, and hence is incapable of fitting properly into a circular tire. The present invention is directed to an improved method of manufacturing such tubes in a circular shape, so that the tube when finished has the proper outside and inside lengths and will lie smoothly within a circular tire without buckling or wrinkling, as is the case with present types. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

In said annexed drawings:—

Figure 8:
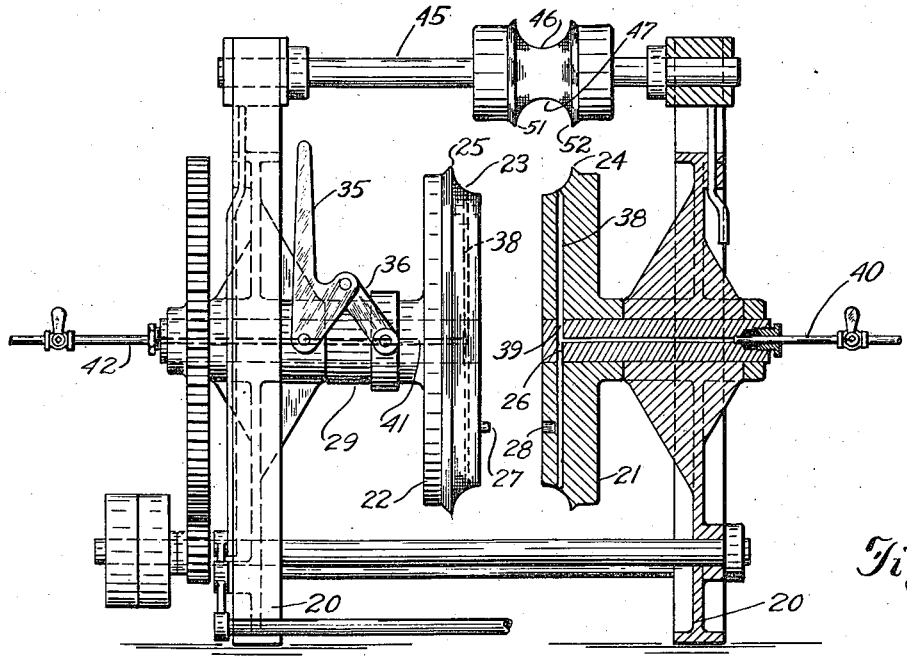
Figure 11:
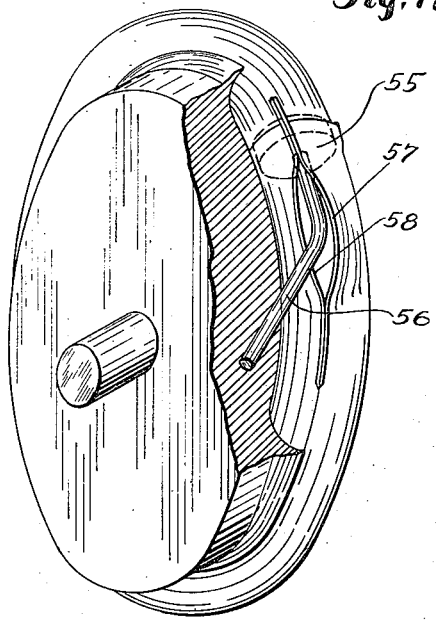
Figure 10:
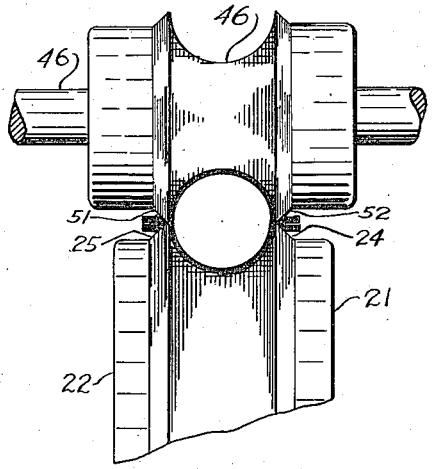

Fig. 1 is a side elevation of a tubing machine constructed to form the strips used in my improved method of making tubes; Fig. 2 is a plan view of the same; Fig. 3 is a partial longitudinal section through the extruding machine; Fig. 4 is an end elevation of the nozzle of the tubing machine; Figs. 5 and 6 are elevations of the rolls for supporting the carriers for the tubing passed out of the tubing machine; Fig. 7 is a front elevation of my improved machine for forming the endless tubes; Fig. 8 is a similar view partially in section, and showing the machine in position for the removal of the finished tube; Fig. 9 is an end elevation of the same machine; Fig. 10 is a partial elevation of the tube-forming rolls with the tube therebetween; Fig. 11 is a view in perspective showing one of the rolls and the tube just before it is completed; Fig. 12 is a transverse section through the two strips extruded from the tubing machine; Fig. 13 is a perspective view of a supporting element to be used in the manufacture of the tube; Fig. 13ª is a section of Fig. 13, and Fig. 14 is a similar view of another member for the same purpose.

Referring now to Figs. 1 and 2 there is shown an extruding machine having the usual supply hopper 2 and internal spiral feeding mechanism 3 operated by means of an exteriorly mounted pulley 4. In the nozzle 5 of the extruding machine is mounted a die 6, which is shown in Figs. 3 and 4, and this die is split at the points 7 to produce two semi-cylindrical strips 8 and 9 of rubber, such as are shown in Fig. 12. Each of these strips is provided with lateral extensions or flanges 10, and as they are passed out of the tubing machine they are received upon suitable conveying mechanism, shown in Figs. 1 and 2. Each conveying mechanism consists of a pair of suitably mounted pulleys 12—12 and 13—13. The pulleys 12—12 for the upper conveyor are shown in cross section in Fig. 6, and are convex, adapting them to form the conveyor belt 14, which is carried thereon, in semi-cylindrical shape, and thus properly support the upper strip 8 as it leaves the tubing machine. The lower rolls 13 are concave and are provided with a semi-circular recess 14 which receives a belt 15, and maintains this belt in a semi-cylindrical shape, adapting it to support the lower strip 9, as shown in Fig. 5. The two strips are forced out of the tubing machine simultaneously, one above the other, and are maintained in the semi-cylindrical form in which they are first extruded by means of the correspondingly formed rolls and conveyor belts, which have just been described. When a suitable length of rubber has been extruded the strips are cut off and are then used in the machine, which will now be described, to form a single endless tube.

In Figs. 7, 8 and 9 I have shown a machine consisting of a suitable base 20, on which are mounted a rotatable roll 21, which is fixed against axial movement, and a second complementary rotatable roll 22 which is movable axially from the position shown in Fig. 8 to the position shown in Fig. 7. In the latter position the two rolls co-operate to form a single roll having a semi-circular recess 23 extending around its outer surface and bounded by two beveled cutting edges 24 and 25. The roll 21 is undriven, but is freely rotatable upon its bearing 26, and is rotated when engaged with the roll 22 by means of dowel pins 27 fitting in the suitable recesses 28, as shown in Fig. 8. The roll 22 is attached to a collar 29, slidable, but non-rotatably mounted upon a shaft 30, which extends through a frame 20, and is there driven by means of gears 31 and 32, the gear 32 being attached to, and driven by, a shaft 33, carrying a pulley 34. Engagement between the two rolls 21 and 22 may be effected by throwing a lever 35, mounted upon the frame, and connected by means of a link 36, with a collar 29. In each of the rolls 21 and 22 there is provided a suction conduit 38, this suction conduit connecting, in the case of the roll 21 with a series of radial passages 39, extending radially and then longitudinally through the bearing 26 and connected to a suitable vacuum line 40. In the roll 22 the radial passages 38 connects with a similar longitudinal passage 41 extending through the shaft 30, and leading to a second vacuum line 42. The function of these vacuum lines is to draw down against the surface of the rolls, the rubber strip which is later placed therein when the two rolls are engaged, and this operation will be described in detail hereafter.

In the upper part of the framework 20 there is mounted a shaft 45 carrying a single roller 46 provided with a semi-circular recess 47 extending thereabout, and one of the same size as the recess which is jointly formed in the rolls 21 and 22 when they are engaged. The shaft 45 is carried in slidable bearing blocks 48 and is adapted to be lifted from the position shown in Fig. 7 into the position shown in Fig. 8 by means of a rod 49 and pivoted lever 50. The roll 46 is provided with beveled cutting edges 51 and 52 disposed to meet the cutting edges 24 and 25 on the rolls 21 and 22 when the rolls are in the position shown in Fig. 7.

The operation of the present apparatus is as follows. One of the strips carried on the conveyors 14 and 15 is first laid in the semi-circular recess formed in the rolls 21 and 22 when the latter are in the position shown in Fig. 7. This strip is packed into this groove or recess, the flanges 10 of the strip extending outwardly over the beveled cutting edges 24 and 25. During this operation the roll 46 is lifted so that it does not engage with the lower rolls, and the strip 9 of rubber is pressed smoothly against the surface of the recess 23 until the ends of the strip overlap to form a joint. In some cases a vacuum may be applied to the lines 40 and 42 to draw the strip 9 tightly against the surface of the lower rolls during this and the subsequent operations.

After the strip has been stretched around the lower rolls a second strip of rubber is superimposed upon the first, with the flanges 10 over-lapping the flanges 10 of the lower strip, and both of these flanges extend over the beveled cutting edges 24 and 25 on the lower rolls. The upper roll 46 is then lowered until its cutting edges meet the cutting edges 24 and 25 of the lower roll, as shown in Fig. 7. During this operation the operator will stand in front of the machine and will feed the upper strip in by hand, pressing the flanges 10 against the flanges on the strip on the lower roll, and operating the machine to rotate the lower roll away from him during this operation. This rotation of the lower roll will bring the over-lapping flanges of the two strips between the registering cutting edges on the upper and lower rolls, and these cutting edges will then act to cut off the excess flange portions of the two strips and pinch together the meeting edges of the upper and lower strips.

During this operation it is desirable to insert between the upper and lower strips some member which will both support the upper strip in the desired cross-sectional form and at the same time make it unnecessary for the operator to register the upper and lower strips. Such a device is shown in Fig. 13 and consists of a short collapsible tube member 60 which is provided with one flattened side 61 about which extend a series of wires 62 on which are mounted a number of small rollers 63. These wires and rollers are so mounted and constructed that the outer surface of the rollers falls in the circular plane of the tube and the entire device is thus made to present a cylindrical outline. This device is slipped between the upper and lower rolls and the upper strip is then superimposed upon this device. It is only necessary for the operator to lay the strip upon this tube which will bring the flange 10 on the strip into perfect registration with the similar flanges on the lower strip and permit them to be properly pinched together as they pass between the cutting edges of the rolls.

In place of the device shown in Fig. 13 I may employ a short length of tubing shown in Fig. 14, which tubing 66 is provided with one closed end 67 and carries at its other end a connection 68 for attachment to an air or vacuum line. If this device is used the outer strip is first laid upon this tube or air bag and the two are then together fed in between the upper and lower rolls. The outer strip will in this way be automatically registered upon the lower strip and the inner tube may be gradually withdrawn as the rolls are rotated. If any difficulty is found in withdrawing the tube, the connection 67 may be attached to a suitable vacuum line and the air exhausted to cause collapse of the tube, after which it can be readily withdrawn.

Before the two ends of the upper or outer strip are superimposed upon each other this flexible mandrel will be withdrawn, and a tool, such as is shown in Fig. 11, inserted. This tool consists of a disc 55 provided with a bent handle 56 and serves as a support, over which the two ends of the outer strip may be lapped and pressed together without altering their original shape. After these two ends have been pressed together over this disc 55 the latter may be slipped out of the tube by turning it lengthwise of the tube and pulling it out between the open edges 57 and 58 of the tube, after which the machine may be again operated to bring these open edges of the two strips between the cutting off rolls to pinch them together and to completely close the tube.

After the tube has thus been formed the upper roll is lifted by pressure upon the foot bar or lever 50, and the roll 22 is moved to the left to permit of the removal of the finished tube, which may then be placed in a mold and vulcanized.

The advantages of the present method are that the tube may be perfectly formed with true and proper internal and external lengths for the respective diameters of the inside and outside of the tube. Other important advantages of this method are the saving in labor required to make the tubes and a considerable saving in the amount of rubber required. In addition to this it is unnecessary to use any cloth for wrapping the tube during vulcanization as was the case when tubes were cured on straight poles, so that the entire method is much more economical than the methods now in general use.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In a method of making annular rubber tubes, the steps which consist in forming two rubber strips of semi-circular outline in cross-section, forming one of said strips into an endless band, superimposing the other of said strips upon the first, and simultaneously pressing together the superimposed edges of said strips to produce a hollow tube.

2. In a method of making annular rubber tubes, the steps which consist in forming two transversely curved strips of raw rubber, bending one of such strips into annular form and uniting the ends thereof, superimposing the other of said strips upon the first to form a hollow tube, uniting the ends of said second strip, and uniting the superimposed edges of said strips.

3. In a method of making annular rubber tubes, the steps which consist in forming two transversely curved strips of raw rubber, forming one of said strips into an endless band superimposing the other of said strips upon said band to constitute a hollow tube, and uniting the superimposed contacting edges of said strips.

4. In a method of forming annular rubber tubes, the steps which consist in forming two rubber strips of semi-circular outline in cross-section, circling one of said strips into an endless band, superimposing the other of said strips upon the first to produce a hollow tube while registering said strips upon an intermediate removable mandrel, and pressing together the superimposed edges of said strips.

5. In apparatus of the character described, the combination of a two-part roll provided with a semi-circular encircling recess adapted to receive a strip of raw rubber therein, and a second roll movably mounted with respect to said first-named roll, said second roll being adapted to co-operate with said first-named roll to press together the edges of such strip and a second strip superimposed concentrically about said first-named strip, the adjustability of the parts permitting the easy removal of the finished article.

6. In a method of making annular rubber tubes, the steps which consist in forming two transversely curved strips of raw rubber, bending one of said strips into annular form and uniting the ends thereof, superimposing the other of said strips upon the first to form a hollow tube, uniting the superimposed edges of said strips, but leaving a portion thereof near the ends of the outer strip un-united, uniting said ends of the outer strip and uniting said portion to completely close said strip.

7. In a method of making annular rubber tubes, the steps which consist in forming two rubber strips of semi-circular outline in cross-section and having projecting lateral edges at each side, forming one of said strips into an endless band, superimposing the other of said strips upon the first so that said lateral edges are in contact, and simultaneously pressing together and cutting said superimposed edges of said strips to produce a tube of circular cross-section.

8. In apparatus of the character described, the combination of a roll provided with a semi-circular encircling recess adapted to receive a strip of raw rubber therein, said roll being divided in two parts at the center of said recess and having one part axially movable with respect to the other, a second roll movably mounted with respect to said first-named roll, said second roll being adapted to co-operate with said first-named roll to press together the edges of such strip, and a second strip superimposed concentrically about said first-named strip.

9. In apparatus of the character described, the combination of a roll provided with a semi-circular encircling recess adapted to receive a strip of raw rubber therein, said roll being divided in two parts at the center of said recess and having radially extending vacuum passages in the periphery of each part thereof, said passages communicating with a vacuum conduit positioned axially of said roll, means for moving one part of said roll axially with respect to the other part, and a second roll movably mounted with respect to said first-named roll.

Signed by me, this 24 day of February, 1920.

HERBERT R. STRATFORD.